(12) United States Patent
Liu

(10) Patent No.: US 11,907,058 B2
(45) Date of Patent: Feb. 20, 2024

(54) METHOD AND DEVICE FOR POSITIONING FAULTY DISK

(71) Applicant: ZTE Corporation, Shenzhen (CN)

(72) Inventor: Yuxue Liu, Nanjing (CN)

(73) Assignee: ZTE CORPORATION, Shenzhen (CN)

( * ) Notice: Subject to any disclaimer, the term of this patent is extended or adjusted under 35 U.S.C. 154(b) by 83 days.

(21) Appl. No.: 17/636,224

(22) PCT Filed: Aug. 27, 2020

(86) PCT No.: PCT/CN2020/111844
§ 371 (c)(1),
(2) Date: Feb. 17, 2022

(87) PCT Pub. No.: WO2021/037167
PCT Pub. Date: Mar. 4, 2021

(65) Prior Publication Data
US 2022/0291991 A1    Sep. 15, 2022

(30) Foreign Application Priority Data

Aug. 27, 2019   (CN) .......................... 201910794264.1

(51) Int. Cl.
G06F 11/00    (2006.01)
G06F 11/07    (2006.01)
G06F 11/22    (2006.01)

(52) U.S. Cl.
CPC ........ *G06F 11/0793* (2013.01); *G06F 11/073* (2013.01); *G06F 11/2221* (2013.01)

(58) Field of Classification Search
CPC . G06F 11/073; G06F 11/0793; G06F 11/2221
See application file for complete search history.

(56) References Cited

U.S. PATENT DOCUMENTS

| | | | |
|---|---|---|---|
| 9,390,750 B1* | 7/2016 | Dawson | G11B 5/00813 |
| 2005/0071557 A1 | 3/2005 | Kawamura et al. | |
| 2005/0216782 A1* | 9/2005 | Saitoh | G06F 11/0793 714/2 |
| 2005/0279837 A1* | 12/2005 | Hajji | G06F 11/1076 235/492 |

(Continued)

FOREIGN PATENT DOCUMENTS

| | | |
|---|---|---|
| CN | 102207829 A | 10/2011 |
| CN | 103218180 B | 3/2017 |

(Continued)

OTHER PUBLICATIONS

European Patent Office. Extended European Search Report for EP Application No. 20856098.7, dated Sep. 28, 2022, pp. 1-9.

(Continued)

*Primary Examiner* — Joshua P Lottich
(74) *Attorney, Agent, or Firm* — Vivacqua Crane, PLLC (57) ABSTRACT

Disclosed are a method and device for positioning a faulty disk. The method comprises: in response to detecting that a first disk is faulted, determining positioning information of the first disk, the positioning information comprising a logic Enclosure Identity (EID) and a logic Slot Identity (SID); and positioning the first disk according to the EID and SID of the first disk.

7 Claims, 5 Drawing Sheets

(56) References Cited

U.S. PATENT DOCUMENTS

| | | | |
|---|---|---|---|
| 2012/0317357 A1 | 12/2012 | Kopylovitz | |
| 2013/0007531 A1* | 1/2013 | Jibbe | G06F 11/1004 |
| | | | 714/E11.029 |
| 2014/0351627 A1* | 11/2014 | Best | G06F 3/0676 |
| | | | 714/6.11 |
| 2017/0185355 A1 | 6/2017 | Yen | |

FOREIGN PATENT DOCUMENTS

| | | |
|---|---|---|
| CN | 107577545 A | 1/2018 |
| CN | 110007976 A | 7/2019 |

OTHER PUBLICATIONS

International Searching Authority. International Search Report and Written Opinion for PCT Application No. PCT/CN2020/111844 and English translation, dated Nov. 30, 2020, pp. 1-10.

\* cited by examiner

```
1、 #lsscsi -g      Command

[0:0:1:0]    disk     HGST      HUS724020ALS640   A280    /dev/sdb    /dev/sg1

2、 # ls -al   /sys/bus/scsi/devices/0:0:1:0/ |grep enclosure     Command lrwxrwxrwx 1 root root 0 May 29 11:20 enclosure_device:Slot01 -> ../../../../
port-0:0:25/end_device-0:0:25/target0:0:24/0:0:24:0/enclosure/0:0:24:0/Slot01

3、 #lsscsi -g      Command

[0:0:24:0]    enclosu SMC       SC846P        0c1f    -        /dev/sg24

4、 # ls -al /sys/bus/scsi/devices/0:0:24:0/enclosure/0:0:24:0/ |grep "Slot"

drwxr-xr-x   3 root root      0 May 26 14:05 Slot00
drwxr-xr-x   3 root root      0 May 26 14:05 Slot01
                  ...
drwxr-xr-x   3 root root      0 May 26 14:04 SlotN
```

```
1☐ #/opt/MegaRAID/storcli/storcli64 /c0 show |grep "PCI Address"
PCI Address = 00:06:00:00

2☐ [root@localhost ~]# lsscsi -g
[1:2:0:0]    disk    IBM      ServeRAID M5210   4.29   /dev/sdb    /dev/sg2

3☐ ls -l /sys/bus/scsi/devices/ |awk -F 'devices/' '{print $2}'
pci0000:00/0000:00:03.2/0000:06:00.0/host1/target1:2:0/1:2:0:0

4☐ /opt/MegaRAID/storcli/storcli64 /c0 show
-------------------------------------------------------------------
EID:Slt   DID State   DG      Size Intf Med SED PI SeSz Model                 --------------
-------------------------------------------------------------
8:2       9 Onln     0 1.817 TB SATA HDD N   N   512B WDC WD2003FYYS-02W0B1 U
-------------------------------------------------------------------
```

METHOD AND DEVICE FOR POSITIONING FAULTY DISK

CROSS REFERENCE TO RELATED APPLICATIONS

This application is a national stage filing under 35 U.S.C. § 371 of international application number PCT/CN2020/111844, filed Aug. 27, 2020, which claims priority to Chinese patent application No. 201910794264.1, filed Aug. 27, 2019. The contents of these applications are incorporated herein by reference in their entirety.

TECHNICAL FIELD

Embodiments of the present disclosure relate to, but not limited to, the field of general server disk management, and in particular to a method and apparatus for positioning a faulty disk.

BACKGROUND

With the technology progress, the storage capacity of one server has increased from dozens of G to hundreds of T now, so the number of enclosures of the server has correspondingly changed from one to multiple, and the number of disks has changed from the first few to dozens now. Undoubtedly, a challenge is brought to the management and positioning of disks. Since the data is invaluable, how to position a faulty disk quickly and accurately among numerous disks is particularly important.

According to the existing technologies, mainly the following methods are adopted to solve the problem:
I. private interfaces of dedicated servers: this method is greatly limited at present as service providers intend to use the general servers conforming to general protocols, rather than the dedicated servers; and
II. rack graph method: this is a mainstream method. With this method, a real device is acquired firstly; then, it takes a lot of time to construct a unique identity for each disk; and, the positions of abnormal disks are displayed to a maintainer by means of the front-end graphical interface. This method has the following disadvantages that different rack graphs need to be constructed for each type of machines, resulting in a high workload; and, it is necessary to develop and coordinate an image interface, resulting high investment and low efficiency.

In addition, the above methods can only solve the disk positioning problem of single physical enclosure and single disk controllers, so the application limitations are increased.

SUMMARY

In view of the above, according to an embodiment of the present disclosure, provided is a method for positioning a faulty disk. The method may include: in response to detecting that a first disk is faulted, determining positioning information of the first disk, the positioning information including a logic enclosure identity (EID) and a logic slot identity (SID); and positioning the first disk according to the EID and SID of the first disk.

According to another embodiment of the present disclosure further provided is an apparatus for positioning a faulty disk. The apparatus may include a determination unit and a positioning unit. The determination unit is configured to, in response to detecting that a first disk is faulted, determine positioning information of the first disk, the positioning information including a logic enclosure identity (EID) and a logic slot identity (SID). The positioning unit is configured to position the first disk according to the EID and SID of the first disk.

According to yet another embodiment of the present disclosure further provided is an device for positioning a faulty disk. The device may include a memory, a processor and computer programs that are stored on the memory and executable by the processor. The computer programs, when executed by the processor, cause the processor to carry out the method for positioning a faulty disk.

According to yet another embodiment of the present disclosure further provided is a non-transitory computer-readable storage medium having information processing programs stored thereon. The information processing programs, when executed by a processor, cause the processor to perform the method for positioning a faulty disk.

In accordance with the technical schemes provided in the embodiments of the present disclosure, a faulty disk can be effectively positioned.

Other features and advantages of the present disclosure will be illustrated in the following description, and will partially become apparent from the description or be appreciated by implementing the present disclosure. The objectives and other advantages of the present disclosure can be realized and obtained by structures specified in this specification, the appended claims and the accompanying drawings.

BRIEF DESCRIPTION OF DRAWINGS

The accompanying drawings are provided for further understanding of the technical schemes of the present disclosure and constitute a part of this description. The accompanying drawings are used with the embodiments of the present application to illustrate the technical schemes of the present disclosure, and are not intended to limit the technical schemes of the present disclosure.

DETAILED DESCRIPTION

In order to make the objectives, technical schemes and advantages of the present disclosure clearer, the embodiments of the present disclosure will be described in detail below with reference to the accompanying drawings. It is to be noted that the embodiments in the present application and the features in the embodiments can be arbitrarily combined with each other if not conflicted.

The steps shown in the flowcharts in the accompanying drawings can be executed in a computer system, for example, containing a set of computer-executable instructions. In addition, although a logic order is shown in the flowcharts, in some cases, the steps shown or described can be executed in an order different from the logic order.

The Small Computer System Interface (SCSI) Enclosure Service (SES for short) is a protocol designed to manage and monitor non-SCSI devices such as power supplies, cooling systems and indicators in a cassis. An upper layer application can send a query or control command to a chassis which supports the SES protocol through an SCSI command, to obtain a current state of the chassis and the devices in the chassis or switch the states of the devices inside the chassis. At present, there are mainly two methods to manage disks in mainstream general servers. One of the methods is to manage disks by using Serial Attached SCSI (SAS) controllers. In this method, one or more SAS controllers are included, and each SAS controller is connected to a plurality of disk devices through an expander device. The other method is to manage disks through RAID cards. In the above two methods, the chassis should follow the SES protocol.

The system file system (Sysfs) is a newly designed virtual memory-based file system in the Linux kernel, which not only has the function of viewing and setting kernel parameters, but also serves as a unified device model in Linux for management. For each hardware device, the Linux kernel maintains two basic data structures, i.e., kobject and kset, to organize tree-type and list-type structures so as to management the hardware. In the Linux system, the above data structures are mapped to a certain directory in the sysfs file system, and certain attribute information in the data structures is mapped to a certain specific file in this directory.

In the technical schemes provided in the embodiments, a scheme for positioning a faulty disk is provided by using technologies such as SES and sysfs. This scheme can effectively position a faulty disk, and is easy to operate, and has high universality, high reliability and easy implementation.

Figure 1:
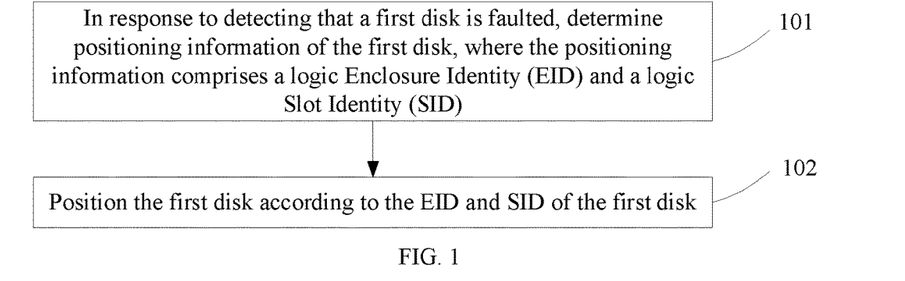
FIG. 1 is a flowchart of a method for positioning a faulty disk according to an embodiment of the present disclosure.

FIG. 1 is a flowchart of a method for positioning a faulty disk according to an embodiment of the present disclosure. As shown in FIG. 1, the method includes steps S101-S102.

At S101, when a fault of a first disk is detected, positioning information of the first disk is determined, where the positioning information includes a logic Enclosure Identity (EID) and a logic Slot Identity (SID).

At S102, the first disk is positioned according to the EID and SID of the first disk.

The step of determining positioning information of the first disk includes:
identifying a management mode of the first disk, where the management mode of the first disk is serial attached SCSI (SAS) controller management or redundant arrays of independent drives (RAID) management; and determining positioning information of the first disk according to the management mode of the first disk.

When the management mode of the first disk is SAS controller management, the step of determining positioning information of the first disk according to the management mode of the first disk includes:
determining Small Computer System Interface (SCSI) bus information of the first disk according to the name of the first disk; and
acquiring the EID and SID of the first disk mapped in a corresponding sysfs according to the SCSI bus information of the first disk.

After the EID and SID of the first disk mapped in the corresponding sysfs are acquired according to the SCSI bus information of the first disk, the method further includes:
verifying whether the SCSI bus information of the first disk presents and whether the SID of the first disk is within a scope of jurisdiction of a logic enclosure corresponding to the EID of the first disk.

The step of positioning the first disk according to the EID and SID of the first disk includes:
in response to the presence of the SCSI bus information of the first disk, and the SID of the first disk being within the scope of jurisdiction of the logic enclosure corresponding to the EID of the first disk, positioning the first disk according to the EID and SID of the first disk.

When the management mode of the first disk is RAID card management, the step of determining positioning information of the first disk according to the management mode of the first disk includes:
acquiring a correspondence table of RAID card controllers and PCI buses;
determining SCSI bus information of the first disk according to the name of the first disk;
acquiring PCI bus information mapped to the corresponding sysfs according to the SCSI bus information of the first disk;
determining, according to the correspondence table and the PCI bus information mapped by the sysfs, an RAID card controller to which the first disk belongs; and
acquiring, according to the RAID card controller to which the first disk belongs, the EID and SID of the first disk.

The step of acquiring, according to the RAID card controller to which the first disk belongs, the EID and SID of the first disk includes:
acquiring the value of a T bit in an HCTL in the SCSI bus of the first disk;
acquiring a DG field of first disk information under the RAID card controller to which the first disk belongs; and
in response to the value of the T bit being equal to the value of the disk group (DG) field, acquiring the EID and SID of the first disk by using the DG field.

The step of positioning the first disk according to the EID and SID of the first disk includes:
warning and/or lighting about the first disk according to the EID and SID of the first disk.

Figure 2:
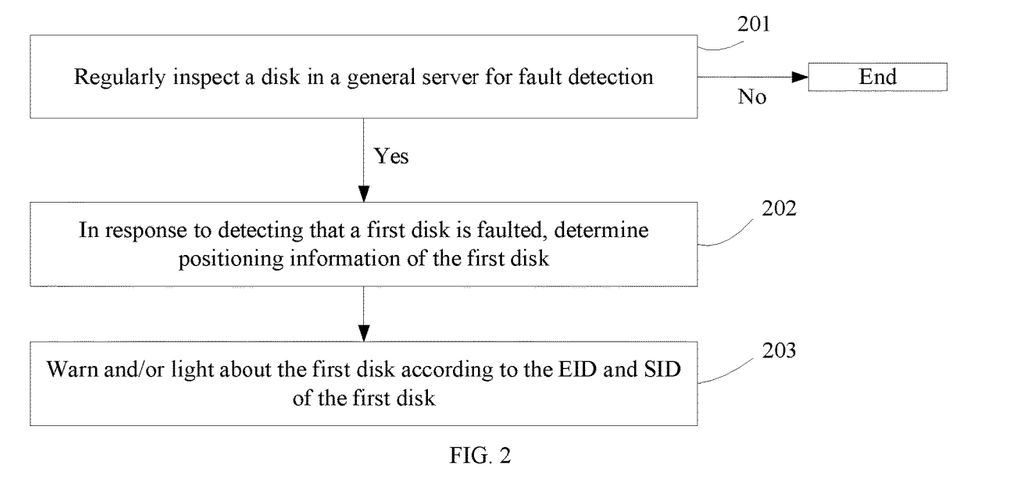
FIG. 2 is a flowchart of a method for positioning a faulty disk according to another embodiment of the present disclosure.

FIG. 2 is a flowchart of a method for positioning a faulty disk according to another embodiment of the present disclosure. As shown in FIG. 2, the method includes steps S201 to S203.

At S201, a disk in a general server is regularly inspected for fault detection.

The specific technology for detecting disk fault may be any one of the exiting schemes, and will not be limited specifically. For example, a disk health analysis scheme or the like can be used.

When a certain disk in the general server is faulted, for example, in this embodiment, when a first disk is faulted, step S202 will be executed; or otherwise, the process ends.

At S202, when a fault of the first disk is detected, positioning information of the first disk is determined.

The step of positioning information includes a logic Enclosure Identity (SID) and a logic Slot Identity (EID).

The step of determining positioning information of the first disk includes:
identifying a management mode of the first disk, where the management mode of the first disk is Serial Attached SCSI (SAS) controller management or Redundant Arrays of Independent Drives (RAID) management; and
determining positioning information of the first disk according to the management mode of the first disk.

In an embodiment, the management of disks mainly focuses on two elements: enclosure identity and slot identity.

Enclosure Identity (EID for short) corresponds to a logic representation of the physical enclosure and represents a logic enclosure. Slot or ArrayDevice identity (SID for short) corresponds to a logic representation of the slot in the actual enclosure and represents a logic slot. Therefore, there is a one-to-one correspondence between the physical position and logic position (Enclosure, Slot) of a certain slot of a specific enclosure in the chassis. Since the controller is different, there are two situations as followings.

Figure 3:
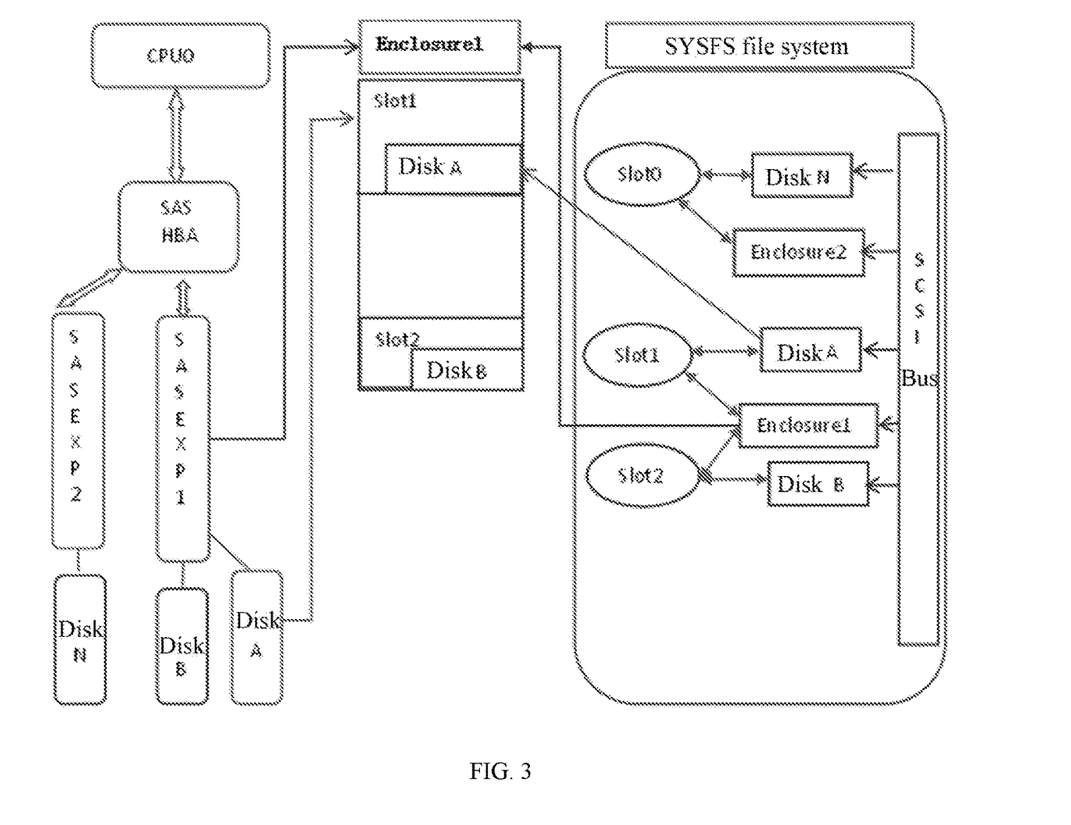
FIG. 3 is a schematic diagram of a correspondence between EIDs (Enclosures) and SIDs (Slots) of disks under an SAS controller according to an embodiment of the present disclosure.

First, for a disk managed by the SAS controller, a correspondence among the controller, the expander (EXP) and the sysfs is shown in FIG. 3, where a logic structure diagram is shown on the left. An SAS HBA (Host Bus Adapter) is hung under a CPU0 (Central Processing Unit), and two physical enclosures SASEXP1 and SASEXP2 are hung under the SAS HBA. The logic enclosure corresponding to the SAS-EXP1 is Enclosure1, and disks A and B are hung under two slots Slot1 and Slot2 under Enclosure1. The logic enclosure corresponding to SASEXP2 is Enclosure2, and a disk N is hung under a slot Slot0 under Enclosure2. Mapping to the sysfs file system is shown on the right of FIG. 3. The SCSI bus information of the disk can be acquired through a disk symbol, and attribute information of the disk under the sysfs can be acquired by using the SCSI bus information to obtain binary information (Enclosure, Slot).

Figure 4:
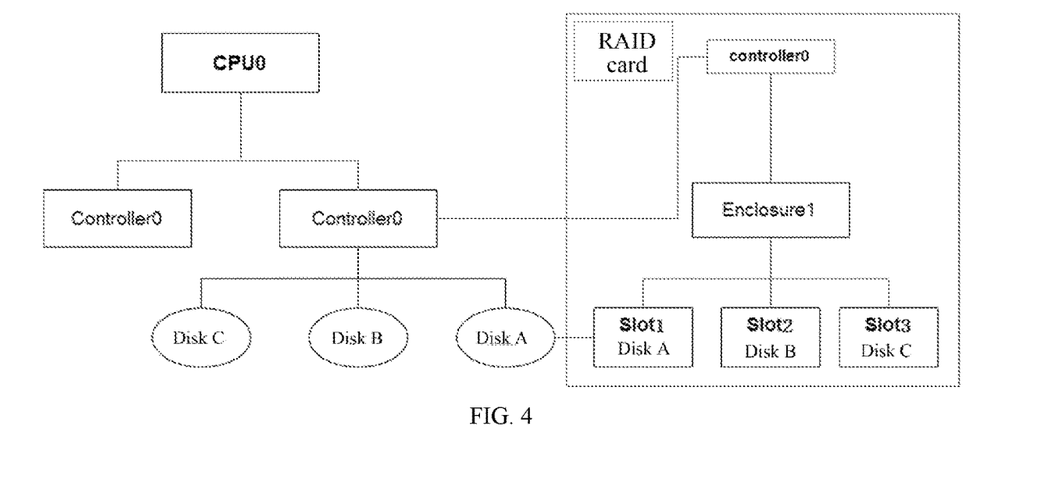
FIG. 4 is a schematic diagram of a correspondence between EIDs (Enclosures) and SIDs (Slots) of RAID card disks according to an embodiment of the present disclosure.

Second, for a disk managed by the RAID (Redundant Arrays of Independent Drives), a correspondence among the controller, the EID and the SID is shown in FIG. 4, where a logic structure diagram is shown on the left. Two controllers Controller0 are hung under CPU0. The logic enclosure corresponding to one Controller0 is Enclosure1, and disks A, B and C are hung under three slots Slot1, Slot2 and Slot3 under Enclosure1. Mapping to the RAID card is shown on the right of FIG. 4. The disk groups (DG) information in the RAID can be found by using a third bit in the bus information, and triple information (Controller, EID, SID) of the disk is thus acquired.

At S203, warning and/or lighting about the first disk is performed according to the EID and SID of the first disk.

In an embodiment, while informed that a disk is already faulted, a maintainer is sent to the machine room to replace the disk. In addition, lighting up the faulty disk in the enclosure corresponding to the EID and SID facilitates the maintainer to accurately execute the disk replacement operation and timely find the faulty disk during the inspection of the machine room.

Figure 5:
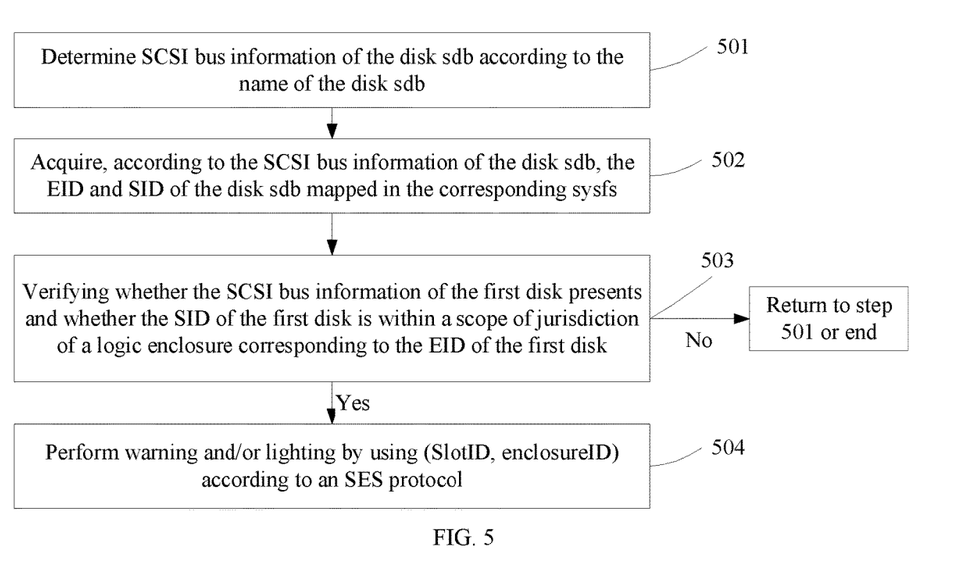
FIG. 5 is a flowchart of a method for positioning a faulty disk according to another embodiment of the present disclosure.

FIG. 5 is a flowchart of a method for positioning a faulty disk according to another embodiment of the present disclosure.

Figure 6:
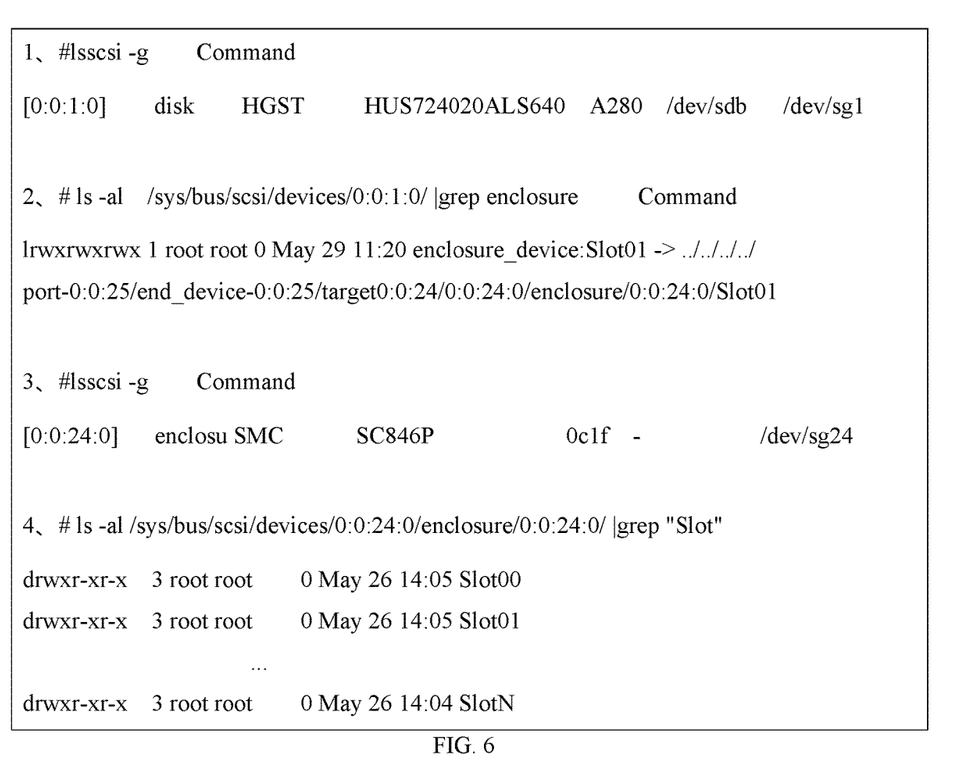
FIG. 6 is a diagram showing an example of an execution process of positioning a faulty disk sdb according to an embodiment of the present disclosure.

In this embodiment, it is assumed that a faulty disk sdb has been found and the management mode of the disk sdb is identified as SAS controller management. FIG. 6 is a diagram showing an example of an execution process of positioning a faulty disk sdb according to an embodiment of the present disclosure.

As shown in FIGS. 5 and 6, the method includes steps S501 to S504.

At S501, the SCSI bus information of the disk sdb is determined according to the name of the disk sdb.

As shown in section 1 in FIG. 6, in this embodiment, the SCSI bus information of the disk sdb is [0:0:1:0].

At S502, the EID and SID of the disk sdb mapped in a corresponding sysfs are acquired according to the SCSI bus information of the disk sdb.

As shown in 2 in FIG. 6, in this embodiment, the EID and SID of the disk sdb are enclosure (0:0:24:0) and Slot01, respectively.

At S503, whether the SCSI bus information of the disk sdb presents is verified, and whether the SID of the disk sdb is within a scope of jurisdiction of a logic enclosure corresponding to the EID of the disk sdb is verified.

As shown in sections 3 and 4 in FIG. 6, in this embodiment, the presence of the bus information is verified, and whether the Slot information is within the scope of jurisdiction of the enclosure is reversely verified by using the enclosure information (0:0:24:0). It can be seen the EID of the device sdb corresponding to the enclosure is sg24. Therefore, the SCSI bus information of the disk sdb presents, and the SID of the disk sdb is within the scope of jurisdiction of the logic enclosure corresponding to the EID of the disk sdb.

When the SCSI bus information of the disk sdb presents and the SID of the disk sdb is within the scope of jurisdiction of the logic enclosure corresponding to the EID of the disk sdb, S504 will be executed; otherwise, the process returns to S501 or the process ends.

At S504, warning and/or lighting is performed by using (SlotID, enclosureID) according to an SES protocol.

Figure 7:
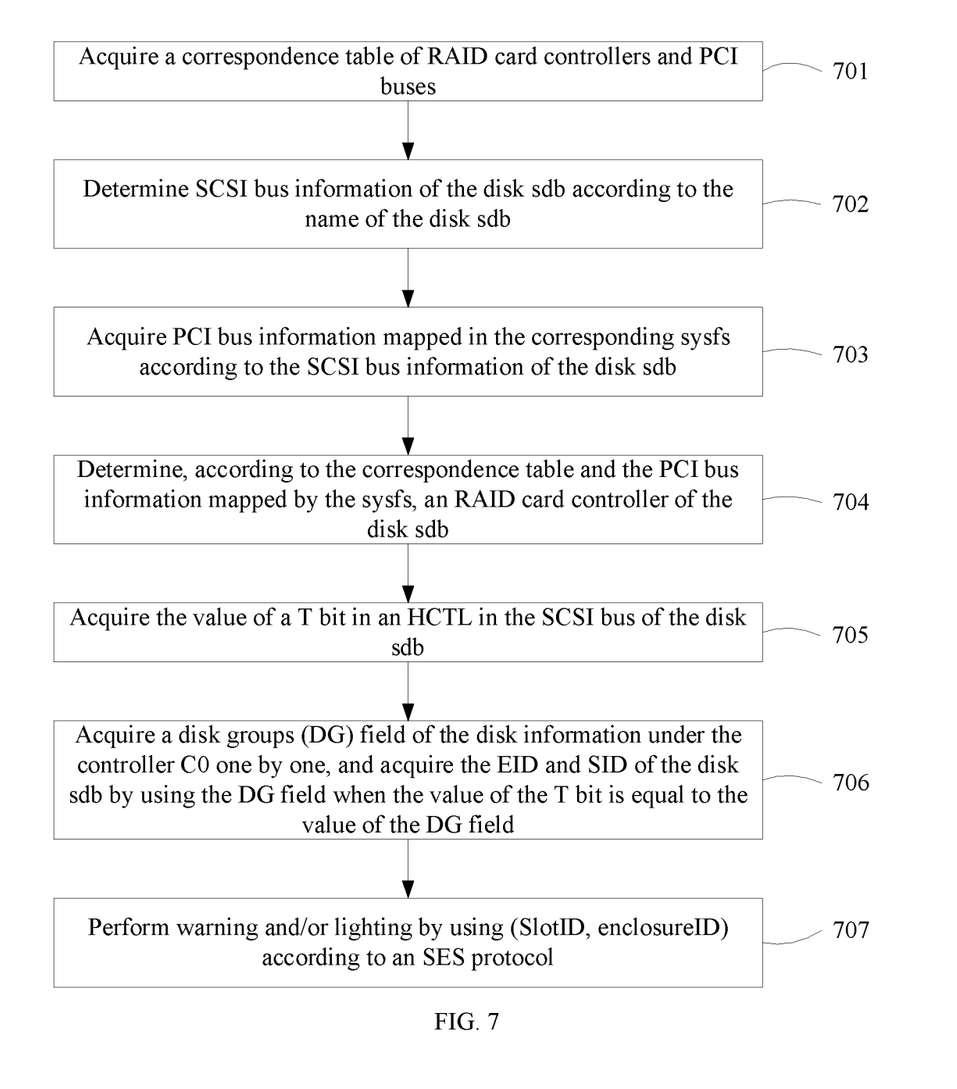
FIG. 7 is a flowchart of a method for positioning a faulty disk according to another embodiment of the present disclosure.
Figure 8:
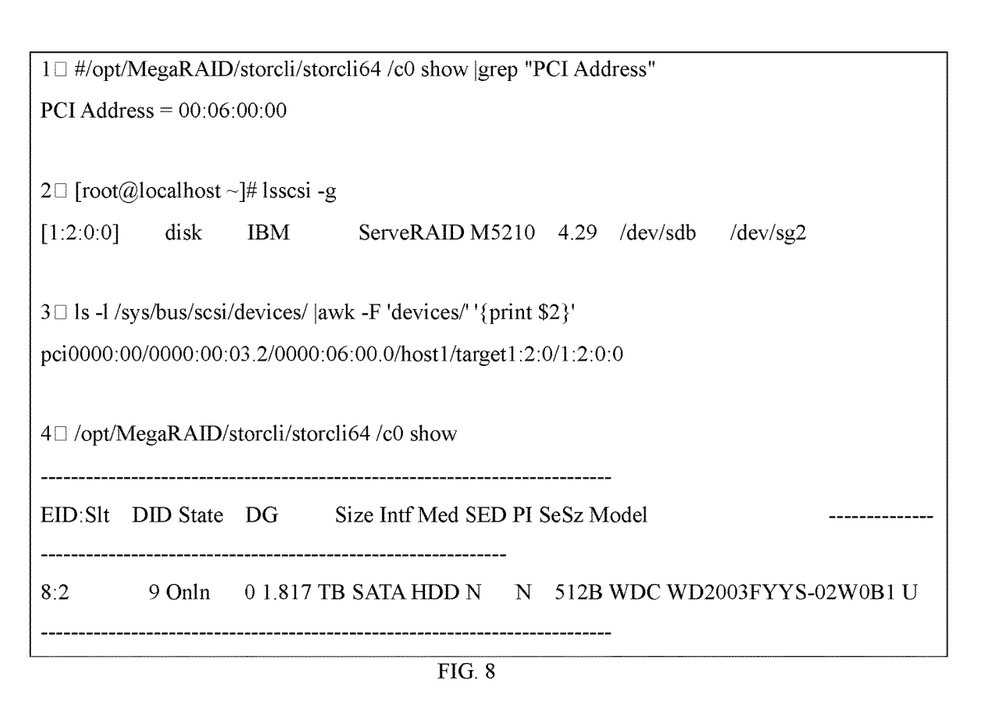
FIG. 8 is a diagram showing an example of an execution process of positioning a faulty disk sdb according to an embodiment of the present disclosure.

FIG. 7 is a flowchart of a method for positioning a faulty disk according to another embodiment of the present disclosure. In this embodiment, it is assumed that a faulty disk sdb has been found and the management mode of the disk sdb is identified as RAID card management. FIG. 8 is a diagram showing an example of an execution process of positioning a faulty disk sdb according to an embodiment of the present disclosure.

As shown in FIGS. 7 and 8, the method includes steps S701 to S707.

At S701, a correspondence table of RAID card controllers and PCI buses is acquired.

As shown in section 1 in FIG. 8, in this embodiment, the correspondence between raid card controllers and PCI buses is acquired, wherein the raid controller C0 corresponds to PCI 00:06:00:00.

At S702, SCSI bus information of the disk sdb is determined according to the name of the disk sdb.

As shown in section 2 in FIG. 8, in this embodiment, the SCSI bus information of the disk sdb is [1:2:0:0].

At 703, PCI bus information mapped in a corresponding sysfs is acquired according to the SCSI bus information of the disk sdb.

As shown in section 3 in FIG. 8, in this embodiment, the PCI bus information corresponding to the SCSI bus information [1:2:0:0] is PCI 00:06:00:00.

At S704, an RAID card controller to which the first disk belongs is determined according to the correspondence table and the PCI bus information mapped in the sysfs.

As shown in section 4 in FIG. 8, in this embodiment, a serial number of the RAID card controller corresponding to the disk sdb is C0.

At S705, the value of a T bit in an HCTL in the SCSI bus of the disk sdb is acquired.

At S706, the Disk Groups (DG) field of the disk information under the controller C0 is acquired one by one; and, when the value of the T bit is equal to the value of the DG field, the EID and SID of the disk sdb are acquired by using the DG field.

As shown in section 4 in FIG. 8, in this embodiment, T=0, DG=0, and the EID and SID of the disk sdb are (8:2), respectively.

At S707, warning and/or lighting is performed by using (SlotID, enclosureID) according to an SES protocol.

Figure 9:
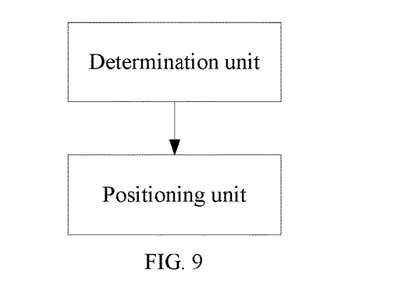
FIG. 9 is a schematic structural diagram of an apparatus for positioning a faulty disk according to an embodiment of the present disclosure.

FIG. 9 is a schematic structural diagram of an apparatus for positioning a faulty disk according to an embodiment of the present disclosure. As shown in FIG. 9, the apparatus includes a determination unit and a positioning unit.

The determination unit is configured to, in response to detecting that a first disk is faulted, determine positioning information of the first disk, where the positioning information including a logic Enclosure Identity (EID) and a logic Slot Identity (SID).

The positioning unit is configured to position the first disk according to the EID and SID of the first disk.

The determination unit is configured to identify a management mode of the first disk, where the management mode of the first disk is Serial Attached SCSI (SAS) controller management or Redundant Arrays of Independent Drives (RAID) management.

The determination unit is further configured to determine positioning information of the first disk according to the management mode of the first disk.

The determination unit is further configured to, in response to the management mode of the first disk being SAS controller management, determine Small Computer System Interface (SCSI) bus information of the first disk according to the name of the first disk.

The determination unit is further configured to acquire the EID and SID of the first disk mapped in a corresponding sysfs according to the SCSI bus information of the first disk.

The apparatus further includes a verification unit.

The verification unit is configured to, after acquiring the EID and SID of the first disk mapped by the corresponding sysfs according to the SCSI bus information of the first disk, verify whether the SCSI bus information of the first disk presents and whether the SID of the first disk is within a scope of jurisdiction of a logic enclosure corresponding to the EID of the first disk.

The positioning unit is further configured to, in response to the presence of the SCSI bus information of the first disk and the SID of the first disk being within the scope of jurisdiction of the logic enclosure corresponding to the EID of the first disk, position the first disk according to the EID and SID of the first disk.

The determination unit is further configured to, in response to the management mode of the first disk being RAID card management, acquire a correspondence table of RAID card controllers and PCI buses;

The determination unit is further configured to determine SCSI bus information of the first disk according to the name of the first disk;

The determination unit is further configured to acquire PCI bus information mapped in the corresponding sysfs according to the SCSI bus information of the first disk;

The determination unit is further configured to determine, according to the correspondence table and the PCI bus information mapped by the sysfs, an RAID card controller to which the first disk belongs; and The determination unit is further configured to acquire, according to the RAID card controller to which the first disk belongs, the EID and SID of the first disk.

The acquiring, according to the RAID card controller to which the first disk belongs, the EID and SID of the first disk includes:

acquiring the value of a T bit in an HCTL in the SCSI bus of the first disk;

acquiring a DG field of first disk information under the RAID card controller to which the first disk belongs; and in response to the value of the T bit being equal to the value of the disk group (DG) field, acquiring the EID and SID of the first disk by using the DG field.

The positioning unit is configured to warn and/or light about the first disk according to the EID and SID of the first disk.

According to an embodiment of the present disclosure a device for positioning a faulty disk is further provided. The device includes a memory, a processor and computer programs that are stored on the memory and executable by the processor. The computer programs, when executed by the processor, cause the processor to carry out one of the above-described methods for positioning a faulty disk.

According to an embodiment of the present disclosure, a non-transitory computer-readable storage medium is further provided. The non-transitory computer-readable storage medium has information processing programs stored thereon, and the information processing programs, when executed by a processor, cause the processor to perform one of the above-described methods for positioning a faulty disk.

It should be understood by a person having ordinary skills in the art that, all or some of the steps in the methods disclosed above and the functional modules/units in the systems and devices disclosed above may be implemented as software, firmware, hardware and suitable combinations thereof. In the hardware implementation, the division of the functional modules/units mentioned above does not necessarily correspond to the division of physical components. For example, one physical component may have multiple functions, or one function or step may be cooperatively executed by a number of physical components. Some or all of the components may be implemented as software executed by processors such as digital signal processors or microprocessors, or implemented as hardware, or implemented as integrated circuits such as application-specific integrated circuits. Such software may be distributed on a computer-readable medium, and the computer-readable medium may include computer storage mediums (or non-temporary mediums) and communication mediums (or temporary mediums). As well-known to a person having ordinary skills in the art, the term computer storage medium includes volatile or non-volatile and removable or non-removable mediums implemented in any method or technology used for storing information (such as computer-readable instructions, data structures, program modules or other data). The computer storage medium includes, but not limited to, RAMs, ROMs, EEPROMs, flash memories or other memory technologies, CD-ROMs, digital video disks (DVDs) or other optical disk storages, magnetic cassettes, magnetic tapes, magnetic disk storages or other magnetic storage devices, or any other mediums which can be used to store desired information and can be accessed by computers.

In addition, as well-known to a person having ordinary skills in the art, the communication medium generally contains computer-readable instructions, data structures, program modules or other data in modulation data signals such as carriers or other transmission mechanisms, and may include any information transfer mediums.

The invention claimed is:

1. A method for positioning a faulty disk, comprising:
in response to detecting that a first disk is faulted, determining positioning information of the first disk, the positioning information comprising a logic Enclosure Identity (EID) and a logic Slot Identity (SID); and positioning the first disk according to the EID and SID of the first disk;
wherein the determining positioning information of the first disk comprises:
identifying a management mode of the first disk, which is Serial Attached SCSI (SAS) controller management or Redundant Arrays of Independent Drives (RAID) management; and
determining positioning information of the first disk according to the management mode of the first disk;
wherein, in response to the management mode of the first disk being SAS controller management, the determining positioning information of the first disk according to the management mode of the first disk comprises:
determining Small Computer System Interface (SCSI) bus information of the first disk according to the name of the first disk;
acquiring the EID and SID of the first disk mapped in a corresponding sysfs according to the SCSI bus information of the first disk; and
verifying whether the SCSI bus information of the first disk presents and whether the SID of the first disk is within a scope of jurisdiction of a logic enclosure corresponding to the EID of the first disk; and
wherein the positioning the first disk according to the EID and SID of the first disk comprises:
in response to there being the SCSI bus information of the first disk and the SID of the first disk being within the scope of jurisdiction of the logic enclosure corresponding to the EID of the first disk, positioning the first disk according to the EID and SID of the first disk.

2. The method of claim 1, wherein, in response to the management mode of the first disk being RAID card management, the determining positioning information of the first disk according to the management mode of the first disk comprises:
acquiring a correspondence table of RAID card controllers and PCI buses;
determining SCSI bus information of the first disk according to the name of the first disk;
acquiring PCI bus information mapped by the corresponding sysfs according to the SCSI bus information of the first disk;
determining, according to the correspondence table and the PCI bus information mapped by the sysfs, a RAID card controller to which the first disk belongs; and
acquiring, according to the RAID card controller to which the first disk belongs, the EID and SID of the first disk.

3. The method of claim 2, wherein the acquiring, according to the RAID card controller to which the first disk belongs, the EID and SID of the first disk comprises:
acquiring the value of a T bit in an HCTL in the SCSI bus of the first disk;
acquiring a DG field of first disk information under the RAID card controller to which the first disk belongs; and
in response to the value of the T bit being equal to the value of the disk group (DG) field, acquiring the EID and SID of the first disk by using the DG field.

4. The method of claim 1, wherein the positioning the first disk according to the EID and SID of the first disk comprises:
warning and/or lighting about the first disk according to the EID and SID of the first disk.

5. A non-transitory computer-readable storage medium having information processing programs stored thereon which, when executed by a processor, cause the processor to perform the method for positioning a faulty disk of claim 1.

6. An apparatus for positioning a faulty disk, comprising:
a determination unit, configured to, in response to detecting that a first disk is faulted, determine positioning information of the first disk, the positioning information comprising a logic Enclosure Identity (EID) and a logic Slot Identity (SID), wherein the determination unit is further configured to identify a management mode of the first disk, which is Serial Attached SCSI (SAS) controller management or Redundant Arrays of Independent Drives (RAID) management, and determine positioning information of the first disk according to the management mode of the first disk, wherein the determination unit is further configured to, in response to the management mode of the first disk being SAS controller management, determine Small Computer System Interface (SCSI) bus information of the first disk according to the name of the first disk, and acquire the EID and SID of the first disk mapped in a corresponding sysfs according to the SCSI bus information of the first disk;
a verification unit configured to, after acquiring the EID and SID of the first disk mapped by the corresponding sysfs according to the SCSI bus information of the first disk, verify whether the SCSI bus information of the first disk presents and whether the SID of the first disk is within a scope of jurisdiction of a logic enclosure corresponding to the EID of the first disk; and
a positioning unit, configured to position the first disk according to the EID and SID of the first disk, wherein the positioning unit is further configured to, in response to there being the SCSI bus information of the first disk and the SID of the first disk being within the scope of jurisdiction of the logic enclosure corresponding to the EID of the first disk, position the first disk according to the EID and SID of the first disk.

7. A device for positioning a faulty disk, comprising a memory, a processor and computer programs that are stored on the memory and executable by the processor, wherein the computer programs, when executed by the processor, cause the processor to carry out a method for positioning a faulty disk, the method comprising:
in response to detecting that a first disk is faulted, determining positioning information of the first disk, the positioning information comprising a logic Enclosure Identity (EID) and a logic Slot Identity (SID); and
positioning the first disk according to the EID and SID of the first disk;
wherein the determining positioning information of the first disk comprises:

identifying a management mode of the first disk, which is Serial Attached SCSI (SAS) controller management or Redundant Arrays of Independent Drives (RAID) management; and determining positioning information of the first disk according to the management mode of the first disk;

wherein, in response to the management mode of the first disk being SAS controller management, the determining positioning information of the first disk according to the management mode of the first disk comprises:

determining Small Computer System Interface (SCSI) bus information of the first disk according to the name of the first disk;

acquiring the EID and SID of the first disk mapped in a corresponding sysfs according to the SCSI bus information of the first disk; and verifying whether the SCSI bus information of the first disk presents and whether the SID of the first disk is within a scope of jurisdiction of a logic enclosure corresponding to the EID of the first disk; and wherein the positioning the first disk according to the EID and SID of the first disk comprises:

in response to there being the SCSI bus information of the first disk and the SID of the first disk being within the scope of jurisdiction of the logic enclosure corresponding to the EID of the first disk, positioning the first disk according to the EID and SID of the first disk.

* * * * *